United States Patent Office 3,345,376
Patented Oct. 3, 1967

3,345,376
POLYHYDRO-6-METHOXY-1-(3,4,5-TRIMETHOXY-PHENYL)-9H-PYRIDO[3,4-b]INDOLES
Jackson B. Hester, Jr., Portage Township, Kalamazoo County, and Joseph Szmuszkovicz, Kalamazoo, Mich., assignors to The Upjohn Company, Kalamazoo, Mich., a corporation of Delaware
No Drawing. Filed Nov. 6, 1963, Ser. No. 321,806
The portion of the term of the patent subsequent to Aug. 24, 1982, has been disclaimed
6 Claims. (Cl. 260—296)

This invention relates to novel indole derivatives and acid addition salts thereof.

The compounds of this invention include the intermediate N-[2-(5-methoxyindol-3-yl)ethyl] - 3,4,5-trimethoxy-benzamide of the formula

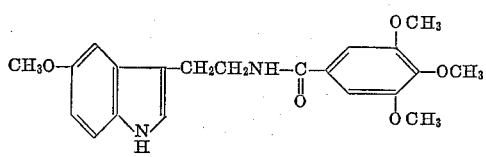

and the polyhydro-6-methoxy-1-(3,4,5-trimethoxyphenyl)-9H-pyrido[3,4-b]indoles of the formula

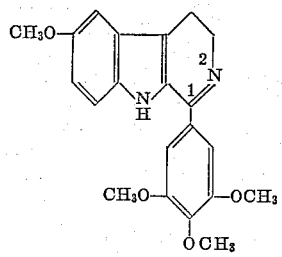

wherein the 1,2-linkage is selected from the linkage consisting of single and double bonds, and the physiologically acceptable acid addition salts of the foregoing 9H-pyrido [3,4-b]indole compounds, such as the hydrochloride, hydrobromide, acetate, pyruvate, sulfate, phosphate, citrate, tartrate, salicylate, lactate, succinate, benzoate, nitrate, p-toluenesulfonate and the like.

9H-pyrido[3,4-b]indole products of this invention are named in accord with the basic structure having positions numbered as follows:

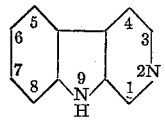

The 9H-pyrido[3,4-b]indoles of this invention demonstrate depressant activity and are suited for use as tranquilizing agents in humans and animals on incorporation as primary active ingredients in conventional pharmaceutical forms such as tablets, capsules, elixirs, injectable solutions and suspensions and the like. Additionally, the free bases form salts with fluosilicic acid which are useful as mothproofing agents in accord with U.S. Patents 1,915,334 and 2,075,359. The free bases also form salts with thiocyanic acid which condense with formaldehyde to form resinous materials useful as pickling inhibitors according to U.S. Patents 2,425,320 and 2,606,155.

In preparing the products of this invention the known 5-methoxytryptamine is reacted with 3,4,5-trimethoxy-benzoyl chloride to give the intermediate N-[2-(5-methoxyindol-3-yl)ethyl]-3,4,5-trimethoxybenzamide which is then cyclized in the presence of phosphorus pentoxide to produce 3,4-dihydro-6-methoxy-1-(3,4,5-trimethoxyphenyl)-9H-pyrido[3,4-b]indole, which is conveniently isolated and purified as the hydrochloride. Neutralization of the hydrochloride in the usual manner gives the free base. The said hydrochloride is reduced to yield 1,2,3,4-tetrahydro-6-methoxy-1-(3,4,5-trimethoxyphenyl) - 9H-pyrido [3,4-b]indole hydrochloride, which on conventional neutralization produces the free base.

The following examples illustrate the synthesis of representative products and intermediate of this invention but are not to be construed as limiting the scope thereof.

EXAMPLE 1

N-[2-(5-methoxyindol-3-yl)ethyl]-3,4,5-trimethoxybenzamide

A solution of 20.0 g. (0.087 mole) of 3,4,5-trimethoxy-benzoyl chloride in 100 ml. of dry benzene was added under nitrogen with stirring to a solution of 15.0 g. (0.079 mole) of 5-methoxytryptamine in 150 ml. of dry benzene. The mixture was kept at 75–80° C. for 2 hours, during which time 7.1 g. of calcium oxide was slowly added. The cooled reaction mixture was poured onto crushed ice and the organic material was extracted with methylene chloride. The methylene chloride extracts were washed successively with water, dilute hydrochloric acid, water and saturated sodium chloride, dried over anhydrous sodium sulfate and concentrated to yield an oil which crystallized from ethyl acetate. The yield of the benzamide was 22.41 g. (74%), M.P. 134.5–138° C. An analytical sample, M.P. 136–138° C., was prepared by recrystallizing the amide from ethyl acetate. The ultraviolet spectrum (ethanol) had λmax. 264 mμ (ε 14,000) and inflections at 228, 296 and 308 mμ (ε 29,800, 7200 and 3950, respectively). The infrared spectrum showed: NH, 3446 and 3390 cm.$^{-1}$;

1630 and 1530 cm.$^{-1}$.

Analysis.—Calcd. for $C_{21}H_{24}N_2O_5$: C, 65.61; H, 6.29; N, 7.29. Found: C, 65.61; H, 6.22; N, 7.28.

EXAMPLE 2

3,4-dihydro-6-methoxy-1-(3,4,5-trimethoxyphenyl)-9H-pyrido[3,4-b]indole hydrochloride A solution of 5.10 g. (0.013 mole) of the amide from Example 1, in 50 ml. of dry xylene, was treated with 20 g. of phosphorus pentoxide. After the mixture had refluxed for 30 minutes, 5 g. of phosphorus pentoxide was added. The resulting mixture was allowed to reflux for 1.5 hours and was then poured into ice water. This mixture was made ammoniacal and extracted with methylene chloride. The methylene chloride extracts were dried over anhydrous sodium sulfate and concentrated in vacuo to yield a dark residue which was dissolved in ethanol and acidified with concentrated hydrochloric acid. Crystallization of the resulting hydrochloride yielded 3.44 g. (64%) of the product hydrochloride, M.P. 257° C. (dec.). An analytical sample, M.P. 256–258° C. (dec.), was prepared by recrystallizing the hydrochloride from ethanol-methylene chloride. The ultraviolet spectrum (ethanol) had λmax. 207 and 394 mμ (ε 48,950 and 19,350, respectively) and inflections at 268 and 340 mμ (ε 5300 and 10,300, respectively).

Analysis.—Calcd. for $C_{21}H_{23}ClN_2O_4$: C, 62.77; H, 5.75; N, 6.96. Found: C, 62.73; H, 5.90; N, 7.04.

EXAMPLE 3

3,4-dihydro-6-methoxy-1-(3,4,5-trimethoxyphenyl)-9H-pyrido[3,4-b]indole

The free base was prepared by suspending the hydrochloride from Example 2 in methylene chloride and stirring the mixture with dilute ammonium hydroxide. The resulting methylene chloride solution was dried over anhydrous sodium sulfate, concentrated in vacuo and the base product crystallized from ethyl acetate, M.P. 209–210° C.

EXAMPLE 4

*1,2,3,4-tetrahydro-6-methoxy-1-(3,4,5-trimethoxyphenyl)-9H-pyrido[3,4-b]indole hydrochloride*

A stirred solution of 5 g. of 3,4-dihydro-6-methoxy-1-(3,4,5-trimethoxyphenyl)-9H-pyrido[3,4-b]indole hydrochloride in 300 ml. of absolute methanol was cooled in an ice bath and treated with 5 g. of sodium borohydride. After 1 hour the mixture was warmed to the reflux temperature and allowed to reflux for 30 minutes; it was then concentrated in vacuo. The residue was treated with 200 ml. of 2 N sodium hydroxide and extracted with methylene chloride. The extract was washed with saturated sodium chloride, dried over anhydrous sodium sulfate and concentrated. A solution of the residue in ethanol was acidified with ethanolic hydrogen chloride and crystallized from ethanol to yield 3.80 g. (75.5%) of 1,2,3,4-tetrahydro-6-methoxy - 1 - (3,4,5 - trimethoxyphenyl)-9H-pyrido[3,4-b]indole hydrochloride, M.P. 267–268° C. (dec.). The analytical sample, M.P. 260–262° C. (dec.), was prepared by recrystallizing the hydrochloride from ethanol. The ultraviolet spectrum (ethanol) had strong end absorption and $\lambda$max. 273 m$\mu$ ($\epsilon$ 12,000) and inflections at 296 and 308 m$\mu$ ($\epsilon$ 5,650 and 4,050, respectively).

*Analysis.*—Calcd. for $C_{21}H_{25}ClN_2O_4$: C, 62.29; H, 6.22; N, 6.92; Cl, 8.76. Found: C, 62.47; H, 6.36; N, 6.89; Cl, 8.64.

EXAMPLE 5

*1,2,3,4-tetrahydro-6-methoxy-1-(3,4,5-trimethoxyphenyl)-9H-pyrido[3,4-b]indole*

Neutralization of the hydrochloride of Example 4 by the method of Example 3 gives the desired free base, 1,2,3,4 - tetrahydro - 6 - methoxy-1-(3,4,5-trimethoxyphenyl)-9H-pyrido[3,4-b]indole.

EXAMPLE 6

*Acid addition salts*

Conventional treatment of the free bases of Examples 3 and 5 with an acid such as hydrochloric, hydrobromic, acetic, pyruvic, sulfuric, phosphoric, citric, tartaric, salicylic, lactic, succinic, benzoic, nitric, p-toluene-sulfonic and the like, followed by purification in the usual manner, gives the corresponding acid addition salt.

What is claimed is:
1. 3,4-dihydro - 6-methoxy-1(3,4,5-trimethoxyphenyl)-9H-pyrido[3,4-b]indole.
2. 3,4 - dihydro-6-methoxy-1-(3,4,5-trimethoxyphenyl)-9H-pyrido[3,4-b]indole hydrochloride.
3. 1,2,3,4 - tetrahydro-6-methoxy-1-(3,4,5-trimethoxyphenyl)-9H-pyrido[3,4-b]indole.
4. 1,2,3,4 - tetrahydro-6-methoxy-1-(3,4,5-trimethoxyphenyl)-9H-pyrido[3,4-b]indole hydrochloride.
5. 3,4 - dihydro-6-methoxy-1-(3,4,5-trimethoxyphenyl)-9H-pyrido[3,4-b]indole and its physiologically acceptable acid addition salts.
6. 1,2,3,4 - tetrahydro-6-methoxy-1-(3,4,5-trimethoxyphenyl)-9H-pyrido[3,4-b]indole and its physiologically acceptable acid addition salts.

References Cited

UNITED STATES PATENTS

| | | | |
|---|---|---|---|
| 2,642,438 | 6/1953 | Duschinsky | 260—296 |
| 2,819,997 | 1/1958 | McLamore | 260—296 |
| 2,819,998 | 1/1958 | McLamore | 260—296 |
| 2,820,040 | 1/1958 | McLamore | 260—296 |
| 2,852,520 | 9/1958 | Robinson | 260—296 |
| 2,980,686 | 4/1961 | Robinson | 260—296 |
| 3,041,039 | 12/1961 | Robinson | 260—296 |
| 3,075,992 | 1/1963 | Hofmann et al. | 260—319 |
| 3,078,214 | 2/1963 | Hofmann et al. | 260—319 |
| 3,202,667 | 8/1965 | Hester et al. | 260—296 |

WALTER A. MODANCE, *Primary Examiner.*

JOHN D. RANDOLPH, *Examiner.*

R. T. BOND, *Assistant Examiner.*